(12) United States Patent
Kato

(10) Patent No.: US 11,502,379 B2
(45) Date of Patent: Nov. 15, 2022

(54) ALL-SOLID-STATE BATTERY LAMINATE

(71) Applicant: TOYOTA JIDOSHA KABUSHIKI KAISHA, Toyota (JP)

(72) Inventor: Kazuhito Kato, Shizuoka-ken (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 288 days.

(21) Appl. No.: 16/728,160

(22) Filed: Dec. 27, 2019

(65) Prior Publication Data

US 2020/0235367 A1 Jul. 23, 2020

(30) Foreign Application Priority Data

Jan. 18, 2019 (JP) .............................. JP2019-007147

(51) Int. Cl.
*H01M 50/531* (2021.01)
*H01M 10/0525* (2010.01)
*H01M 10/0585* (2010.01)

(52) U.S. Cl.
CPC ..... *H01M 50/531* (2021.01); *H01M 10/0525* (2013.01); *H01M 10/0585* (2013.01); *H01M 2220/20* (2013.01)

(58) Field of Classification Search
CPC .......... H01M 50/531; H01M 10/0525; H01M 10/0585; H01M 2220/20; H01M 4/70; H01M 50/54; H01M 4/13; H01M 4/667; H01M 2004/021; H01M 2200/30; Y02E 60/10; Y02P 70/50
USPC ....................................................... 429/162
See application file for complete search history.

(56) References Cited

U.S. PATENT DOCUMENTS

| | | | |
|---|---|---|---|
| 2014/0079992 A1* | 3/2014 | Tanaka | H01M 10/0562 429/210 |
| 2018/0212210 A1 | 7/2018 | Suzuki | |
| 2018/0226652 A1* | 8/2018 | Mori | H01M 10/0525 |
| 2018/0233711 A1* | 8/2018 | Kato | H01M 4/66 |
| 2019/0190073 A1* | 6/2019 | Suzuki | H01M 50/186 |

FOREIGN PATENT DOCUMENTS

| | | |
|---|---|---|
| CN | 108334256 A | 7/2018 |
| JP | 2014-238915 A | 12/2014 |
| JP | 2017-168270 A | 9/2017 |
| JP | 2017220447 A | 12/2017 |

OTHER PUBLICATIONS

English specification of U.S. Appl. No. 16/524,431, based on JP Patent Application No. 2018-142443.

* cited by examiner

*Primary Examiner* — Gary D Harris
(74) *Attorney, Agent, or Firm* — Dickinson Wright, PLLC

(57) ABSTRACT

Provided is a laminate-type all-solid state battery configured to suppress the occurrence of short circuits. Disclosed is an all-solid-state battery, wherein a width of the anode layer is larger than a width of the cathode layer; wherein the anode current collector layer comprises an anode current collector layer protrusion protruding in plane direction at any one side of the battery laminate; wherein the cathode current collector layer comprises a cathode current collector layer protrusion protruding in plane direction at any one side of the battery laminate; and wherein the battery laminate comprises side surface fixing portions composed of a resin.

6 Claims, 4 Drawing Sheets

ALL-SOLID-STATE BATTERY LAMINATE

TECHNICAL FIELD

The disclosure relates to an all-solid-state battery.

BACKGROUND

In recent years, with the rapid spread of IT and communication devices such as personal computers, camcorders and cellular phones, great importance has been attached to the development of batteries that is usable as the power source of such devices. In the automobile industry, etc., high-power and high-capacity batteries for electric vehicles and hybrid vehicles are under development.

Of all-solid-state batteries, an all-solid-state lithium ion battery has attracted attention, due to its high energy density resulting from the use of a battery reaction accompanied by lithium ion transfer, and due to the use of a solid electrolyte as the electrolyte present between the cathode and the anode, in place of a liquid electrolyte containing an organic solvent.

Patent Literature 1 discloses a resin-coated cathode foil composed of an aluminum foil.

Patent Literature 1: Japanese Patent Application Laid-Open (JP-A) No. 2014-238915

For a laminate-type all-solid-state battery composed of stacked battery units, a crack may be formed inside the electrode layers and the solid electrolyte layers when bundling a group of the current collector layer protrusions, and short circuits may occur in the all-solid-state battery.

SUMMARY

In light of the above circumstances, an object of the disclosed embodiments is to provide a laminate-type all-solid-state battery configured to suppress the occurrence of short circuits.

In a first embodiment, there is provided an all-solid-state battery comprising a battery laminate composed of two or more battery units, each of which comprises a cathode comprising a cathode current collector layer and a cathode layer, an anode comprising an anode current collector layer and an anode layer, and a solid electrolyte layer disposed between the cathode layer and the anode layer, wherein a width of the anode layer is larger than a width of the cathode layer;

wherein the anode current collector layer comprises an anode current collector layer protrusion protruding in plane direction at any one side of the battery laminate;

wherein the cathode current collector layer comprises a cathode current collector layer protrusion protruding in plane direction at any one side of the battery laminate; and wherein the battery laminate comprises side surface fixing portions composed of a resin, in at least any one of a peripheral portion including side surfaces of the anode current collector layer protrusion at both adjacent sides of an anode current collector layer protrusion side of the anode current collector layer, and a peripheral portion including side surfaces of the cathode current collector layer protrusion at both adjacent sides of a cathode current collector layer protrusion side of the cathode current collector layer.

In a second embodiment, the all-solid-state battery may be an all-solid-state battery wherein, for at least one of a group of the anode current collector layers and a group of the cathode current collector layers, at least one of the protrusions of the at least one of the group of the current collector layers comprises a current collector layer reinforcing portion comprising a reinforcing material, in at least a part of a predetermined region of the protrusion.

In a third embodiment, the all-solid-state battery may be an all-solid-state battery wherein, for at least one of a group of the anode current collector layers and a group of the cathode current collector layers, at least two of the protrusions of the at least one of the group of the current collector layers, the at least two protrusions facing each other in the laminating direction of the battery laminate, comprise a current collector layer attaching portion containing a resin, in at least a part of a predetermined region of the protrusions, and wherein the at least two protrusions are attached through the current collector layer attaching portion in a manner that allows them to be bent using the region as a bending starting point.

In a fourth embodiment, there is provided an all-solid-state battery comprising a battery laminate composed of two or more battery units, each of which comprises a cathode comprising a cathode current collector layer and a cathode layer, an anode comprising an anode current collector layer and an anode layer, and a solid electrolyte layer disposed between the cathode layer and the anode layer, wherein a width of the anode layer is larger than a width of the cathode layer;

wherein the anode current collector layer comprises an anode current collector layer protrusion protruding in plane direction at any one side of the battery laminate;

wherein the cathode current collector layer comprises a cathode current collector layer protrusion protruding in plane direction at any one side of the battery laminate; and wherein, for at least one of a group of the anode current collector layers and a group of the cathode current collector layers, at least two of the protrusions of the at least one of the group of the current collector layers, the at least two protrusions facing each other in the laminating direction of the battery laminate, comprise a current collector layer attaching portion containing a resin, in at least a part of a predetermined region of the protrusions, and wherein the at least two protrusions are attached through the current collector layer attaching portion in a manner that allows them to be bent using the region as a bending starting point.

According to the disclosed embodiments, the laminate-type all-solid-state battery configured to suppress the occurrence of short circuits, can be provided.

BRIEF DESCRIPTION OF THE DRAWINGS

In the accompanying drawings.

DETAILED DESCRIPTION

Figure 1:
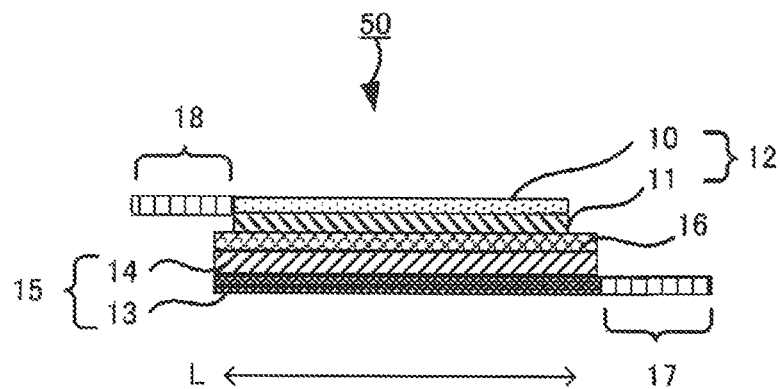
FIG. 1 is a schematic sectional view of an example of the battery unit of the disclosed embodiments.

In the first embodiment, there is provided an all-solid-state battery comprising a battery laminate composed of two or more battery units, each of which comprises a cathode comprising a cathode current collector layer and a cathode layer, an anode comprising an anode current collector layer and an anode layer, and a solid electrolyte layer disposed between the cathode layer and the anode layer, wherein a width of the anode layer is larger than a width of the cathode layer;

wherein the anode current collector layer comprises an anode current collector layer protrusion protruding in plane direction at any one side of the battery laminate;

wherein the cathode current collector layer comprises a cathode current collector layer protrusion protruding in plane direction at any one side of the battery laminate; and wherein the battery laminate comprises side surface fixing portions composed of a resin, in at least any one of a peripheral portion including side surfaces of the anode current collector layer protrusion at both adjacent sides of an anode current collector layer protrusion side of the anode current collector layer, and a peripheral portion including side surfaces of the cathode current collector layer protrusion at both adjacent sides of a cathode current collector layer protrusion side of the cathode current collector layer.

In a laminate-type all-solid-state battery, current collector terminals are attached to the cathode current collector layer and anode current collector layer of the battery, while the current collector layers are in a bundled state. However, tension is applied to the current collector layers when bundling them, whereby a crack may be formed in the electrode layers, which are disposed near the current collector layers, and solid electrolyte layer of the battery, and short circuits may occur in the all-solid-state battery.

Even if short circuits do not occur in the battery in and immediately after its production, there is a possibility that due to vibrations of vehicles in use, etc., load transfers to portions near the current collector layers through the terminals and causes short circuits in the all-solid-state battery.

It was found that by forming the side surface fixing portions in the predetermined positions at side surfaces of the battery laminate, the predetermined positions including the current collector layer protrusion, and/or by forming the current collector layer attaching portion at the position serving as the starting point for bending the current collector layer protrusion, the current collector layer protrusion can be bent without applying load to the electrode layers and the solid electrolyte layer, whereby the occurrence of short circuits in the all-solid-state battery is suppressed, and the occurrence of defects in the all-solid-state battery after the all-solid-state battery is put on the market, is suppressed.

Hereinafter, the above-described embodiments will be described in detail, with reference to figures.

In the figures, for the sake of simplicity, one reference sign is applied to identical or corresponding portions, and repetition of description is avoided. Some of the components of the embodiments may be omitted. However, the examples illustrated in the following figures are merely examples and do not limit the scope of the present disclosure.

FIG. 1 is a schematic sectional view of an example of the battery unit of the disclosed embodiments.

As shown in FIG. 1, a battery unit 50 comprises a cathode 12 comprising a cathode current collector layer 10 and a cathode layer 11, an anode 15 comprising an anode current collector layer and an anode layer 14, and a solid electrolyte layer 16 disposed between the cathode layer 11 and the anode layer 14.

As shown in FIG. 1, for the battery unit 50, the width in a plane direction L of the cathode layer 11 is smaller than the width in a plane direction L of the anode layer 14. Accordingly, the formation of dendrites of metal ions serving as a charge carrier (e.g., lithium ions) can be suppressed.

[Current Collector Layer Protrusion]

As shown in FIG. 1, the anode current collector layer 13 comprises an anode current collector layer protrusion 17 protruding in the plane direction L at one side of the battery unit 50, and the cathode current collector layer 10 comprises a cathode current collector layer protrusion 18 protruding in the plane direction L at the other side of the battery unit 50, which is opposite to the side where the anode current collector layer protrusion 17 protrudes. The side where the cathode current collector layer protrusion 18 protrudes may be any side of the battery unit 50, and it may be the same side where the anode current collector layer protrusion 17 protrudes. In this case, the cathode current collector layer protrusion 18 and the anode current collector layer protrusion 17 may protrude in positions where they do not overlap with each other when viewed from above, to ensure that the cathode current collector layer protrusions 18 can be easily bundled, and the anode current collector layer protrusions 17 can be also easily bundled.

(1) First Embodiment

Figure 2:
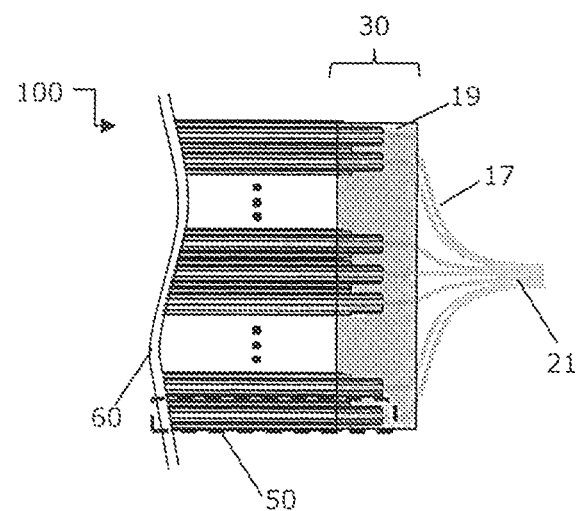
FIG. 2 is a schematic sectional view of an example of the all-solid-state battery of the first embodiment.

FIG. 2 is a schematic sectional view of an example of the all-solid-state battery of the first embodiment.

As shown in FIG. 2, an all-solid-state battery 100 comprises a battery laminate 60 composed of a plurality of the battery units 50, each of which is indicated as a region surrounded by a dashed line. The battery units 50 are disposed adjacent to each other and share the cathode current collector layer 10 or the anode current collector layer 13. In FIG. 2, the cathode current collector layer protrusion 18 is omitted and is not illustrated. Also in FIG. 2, portions indicated by mean omitted portions of the battery unit 50. The same applies to portions indicated by " . . . " in the below-described FIGS. 4 and 8.

As shown in FIG. 2, the ends of the anode current collector layer protrusions 17 are bundled at a bundled portion 21.

The number of the battery units 50 of the all-solid-state battery 100 may be at least two. For example, it may be two or more and 50 or less. The same applies to the number of the battery units 50 of the below-described all-solid-state batteries of the second, third and fourth embodiments.

[Side Surface Fixing Portions]

Figure 3:
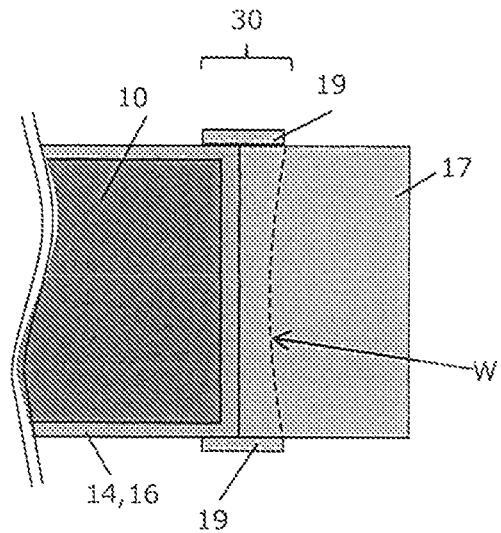
FIG. 3 is a schematic plan view of an example of an all-solid-state battery 100 viewed from above in the laminating direction.

FIG. 3 is a schematic plan view of an example of an all-solid-state battery 100 viewed from above in the laminating direction.

As shown in FIG. 3, the battery laminate comprises side surface fixing portions 19 composed of a resin, in a peripheral portion 30 including side surfaces of the anode current collector layer protrusion 17 at both adjacent sides of an anode current collector layer protrusion 17 side of the all-solid-state battery 100. A dashed line W indicates how the bundled anode current collector layer protrusions 17 are bent (i.e., a bending starting point). The side surface fixing portions 19 shown in FIG. 3 are disposed in the following positions that are defined as a peripheral portion 30: the positions of the ends of side surfaces, which are at the side where the anode current collector layer protrusion 17 is disposed, of the anode layer 14; the positions of the ends of side surfaces, which are at the side where the anode current collector layer protrusion 17 is disposed, of the solid electrolyte layer 16; and the positions of side surfaces, which are in the vicinity of the starting point of the anode current collector layer protrusion 17, of the anode current collector layer protrusion 17. In the disclosed embodiments, from the viewpoint of suppressing the occurrence of short circuits in the all-solid-state battery, the side surface fixing portions 19 may be also disposed in the positions of side surfaces, which are at the side where the anode current collector layer protrusion 17 is disposed, of the cathode current collector layer 10 and the cathode layer 11. The same applies to the side surface fixing portions 19 shown in the below-described FIGS. 5 to 7.

As shown in FIG. 3, from the viewpoint of suppressing the formation of dendrites of metal ions serving as a charge carrier (e.g., lithium ions), the cathode layer 11 may be disposed inside the anode layer 14 when the all-solid-state battery 100 is viewed from above in the laminating direction.

Due to the presence of the side surface fixing portions 19, reduced stress is applied to the cathode layer 11, the anode layer 14 and the solid electrolyte layer 16, and the formation of a crack in the layers is suppressed. Accordingly, the occurrence of short circuits in the all-solid-state battery 100 is suppressed.

The battery laminate may comprise the side surface fixing portions 19 in at least any one of the peripheral portion 30 including side surfaces of the anode current collector layer protrusion 17 at both adjacent sides of the anode current collector layer protrusion 17 side of the all-solid-state battery 100, and the peripheral portion including side surfaces of the cathode current collector layer protrusion 18 at both adjacent sides of the cathode current collector layer protrusion 18 side of the all-solid-state battery 100.

From the viewpoint of further suppressing the occurrence of short circuits in the all-solid-state battery 100, the battery laminate may comprise the side surface fixing portions 19 in both the peripheral portion 30 including side surfaces of the anode current collector layer protrusion 17 at both adjacent sides of the anode current collector layer protrusion 17 side of the all-solid-state battery 100, and the peripheral portion including side surfaces of the cathode current collector layer protrusion 18 at both adjacent sides of the cathode current collector layer protrusion 18 side of the all-solid-state battery 100.

As the resin that is used as the material for the side surface fixing portions 19, examples include, but are not limited to, a conventionally-known, hot-melt agent, a thermosetting resin, a thermoplastic resin, and an UV curable resin. The hardness of the resin is not particularly limited and may be 5 MPa or more.

The side surface fixing portions 19 may be a thin plate composed of the resin, or it may be a hard adhesive tape produced by applying an adhesive to a tape formed from the resin, for example.

The method for disposing the side surface fixing portions 19 is not particularly limited. For example, the side surface fixing portions may be disposed by forming the battery laminate 60, applying the resin to side surfaces of the battery laminate 60, and curing the applied resin. The method for applying the resin is not particularly limited. The resin may be applied by various kinds of methods such as a spraying method and a doctor blade method.

The detailed positions included as the peripheral portion of the battery laminate 60, in which the side surface fixing portions 19 are disposed, may include the following positions: (1) for side surfaces of the battery laminate 60 at both adjacent sides of the current collector layer protrusion side of the battery laminate 60, the positions of the ends of side surfaces, which are at the side where the current collector layer protrusion is disposed, of the anode layer 14 and the positions of the ends of side surfaces, which are at the side where the current collector layer protrusion is disposed, of the solid electrolyte layer 16, and (2) the positions of side surfaces, which are in the vicinity of the starting point of at least one of the cathode current collector layer protrusion 18 and the anode current collector layer protrusion 17, of at least one of the cathode current collector layer protrusion 18 and the anode current collector layer protrusion 17. As needed, the positions of the ends of side surfaces, which are at the side where the current collector layer protrusion is disposed, of the cathode current collector layer 10 and the cathode layer 11 may be included.

As long as the side surface fixing portions 19 are disposed in at least the peripheral portion, the side surface fixing portions 19 may be disposed all over side surfaces, which are at both adjacent sides of the current collector layer protrusion side of the battery laminate 60, of the cathode current collector layer 10, the cathode layer 11, the anode current collector layer 13, the anode layer 14 and the solid electrolyte layer 16. From the viewpoint of increasing the energy density of the all-solid-state battery, the side surface fixing portions 19 may be disposed only in the peripheral portion.

By the side surface fixing portions 19, the peripheral portion of side surfaces of the battery laminate 60 is fixed; the position where the current collector layer protrusions are bent when bundling the current collector layer protrusions, is controlled to be the predetermined position of the current collector layer protrusion; and the current collector layer protrusions are fixed in a manner that prevents their movement. Accordingly, the all-solid-state battery obtains such a structure that bending stress is not applied to the inside of the electrode layers and the solid electrolyte layer, whereby the occurrence of short circuits in the all-solid-state battery is suppressed.

(2) Second Embodiment

[Current Collector Layer Reinforcing Portion]

Figure 4:
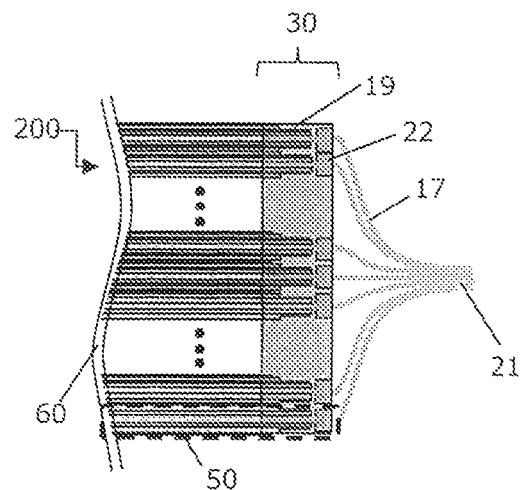
FIG. 4 is a schematic sectional view of an example of the all-solid-state battery of the second embodiment.

FIG. 4 is a schematic sectional view of an example of the all-solid-state battery of the second embodiment.

For an all-solid-state battery 200 shown in FIG. 4, in addition to the structure of the all-solid-state battery 100 shown in FIG. 2, current collector layer reinforcing portions 22 comprising a reinforcing material, are each disposed in at least a part of a predetermined region of each anode current collector layer protrusion 17.

The reinforcing material may be selected from the materials exemplified above as the material for the side surface fixing portions.

The predetermined region means a region serving as a bending starting point when the current collector layer protrusions are bundled. Depending on the length in the plane direction of the current collector layer protrusions, it can be appropriately controlled to be a position that ensures that a crack is less likely to be formed in the anode layer 14, the solid electrolyte layer 16, etc.

The all-solid-state battery 200 is the all-solid-state battery of the second embodiment. In the all-solid-state battery 200, for at least one of a group of the anode current collector layers 13 and a group of the cathode current collector layers 10, at least one of the protrusions of the at least one of the group of the current collector layers may comprise a current collector layer reinforcing portion 22 comprising a reinforcing material, in at least a part of a predetermined region of the protrusion.

As described above, at least one of the protrusions of the at least one of the group of the current collector layers may comprise a current collector layer reinforcing portion 22 comprising a reinforcing material, in at least a part of a predetermined region of the protrusion. However, from the viewpoint of further suppressing the occurrence of short circuits in the all-solid-state battery 200, all of the protrusions may comprise the current collector layer reinforcing portion 22 comprising the reinforcing material, in at least a part of the predetermined region of each protrusion.

Also, from the viewpoint of further suppressing the occurrence of short circuits in the all-solid-state battery 200, the anode current collector layer protrusions 17 may each comprise the current collector layer reinforcing portion 22 comprising the reinforcing material, in at least a part of a predetermined region of each anode current collector layer protrusion 17, and the cathode current collector layer protrusions 18 may each comprise the current collector layer reinforcing portion 22 comprising the reinforcing material, in at least a part of a predetermined region of each anode current collector layer protrusion 18.

Figure 5:
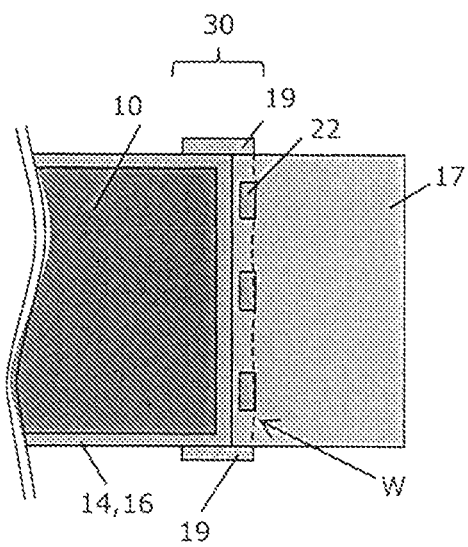
FIG. 5 is a schematic plan view of an example of an all-solid-state battery 200 viewed from above in the laminating direction.

FIG. 5 is a schematic plan view of an example of an all-solid-state battery 200 viewed from above in the laminating direction.

The all-solid-state battery 200 may comprise the current collector layer reinforcing portions 22 comprising the reinforcing material, in at least a part of the predetermined region of each protrusion. As shown in FIG. 5, from the viewpoint of further suppressing the occurrence of short circuits in the all-solid-state battery 200, the current collector layer reinforcing portions 22 maybe disposed at, along the bending starting point W that is used when bundling the current collector layers, at least both ends and the center of the region serving as the bending starting point W, to ensure that the current collector layer reinforcing portions 22 can be symmetric along the center line in the plane direction.

Figure 6:
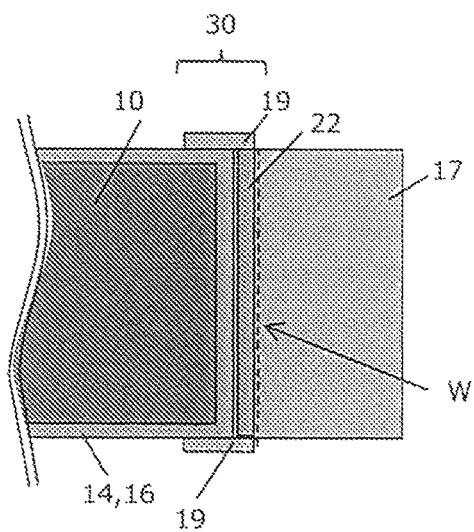
FIG. 6 is a schematic plan view of another example of the all-solid-state battery 200 viewed from above in the laminating direction.

FIG. 6 is a schematic plan view of another example of the all-solid-state battery 200 viewed from above in the laminating direction.

As shown in FIG. 6, from the viewpoint of further suppressing the occurrence of short circuits in the all-solid-state battery 200, the current collector layer reinforcing portions 22 may be disposed over the whole regions serving as the bending starting point W of the protrusions, along the bending starting point W that is used when bundling the current collector layers.

In general, the current collector layers are relatively thinner than other layers, and they have low elasticity. Accordingly, they are bundled in such a state that the center of the current collector layer protrusions and the area around the center are slightly curved inward.

In the case of the first embodiment, the all-solid-state battery satisfactorily functions. However, the side surface fixing portions 19 are needed to be disposed in such a manner that they have a large current collector layer protrusion-side length, considering the curvature of the current collector layer protrusions. As a result, the energy density of the battery is decreased.

In the case of the second embodiment, in addition to the side surface fixing portions 19 of the first embodiment, the current collector layer reinforcing portions 22 are disposed in the predetermined positions of each current collector layer protrusion. Accordingly, the curvature value of the current collector layer protrusions when bundled, is decreased, and the occurrence of short circuits in the all-solid-state battery is suppressed. In addition, the amount of the resin used to form the side surface fixing portions 19 is decreased, and the energy density of the all-solid-state battery is increased.

(3) Third Embodiment

[Current Collector Layer Attaching Portion]

The all-solid-state battery of the third embodiment will be described with reference to FIG. 7.

Figure 7:
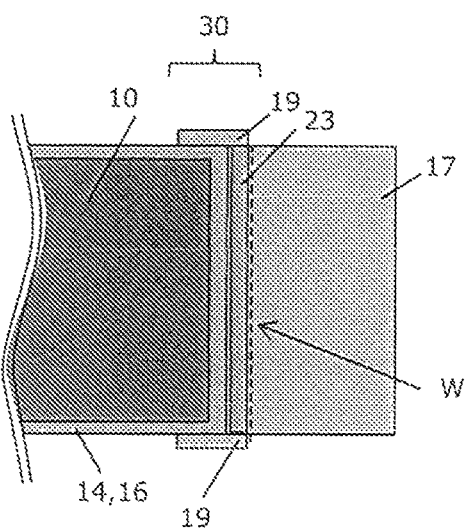
FIG. 7 is a schematic plan view of another example of the all-solid-state battery 200 viewed from above in the laminating direction.

FIG. 7 is a schematic plan view of another example of the all-solid-state battery 200 viewed from above in the laminating direction. Also, FIG. 7 is a view of an example of the case where a current collector layer attaching portion 23 is disposed in place of the current collector layer reinforcing portion 22. The current collector layer attaching portion 23 will be described later.

By the current collector layer attaching portion 23, the current collector layer protrusion of each current collector layer is controlled to be curved. In addition, by fixing the current collector layer protrusion by the side surface fixing portions 19 in a manner that prevents its movement, bending stress is less likely to be applied to the inside of the cathode layer 11, the anode layer 14 and the solid electrolyte layer 16, and the insulation reliability of the all-solid-state battery is ensured. The all-solid-state battery 200 shown in FIG. 7 has the following structure: the current collector layers are fixed by the current collector layer attaching portions 23 disposed in the predetermined region of each current collector layer protrusion, whereby the current collector layer protrusions are bundled using the predetermined region as the bending starting point W.

In the third embodiment, in addition to the side surface fixing portions 19 of the first embodiment, the current collector layer attaching portion 23 is disposed in the predetermined position of each current collector layer protrusion. Accordingly, the curvature value of the current collector layer protrusions when bundled, is decreased, and the occurrence of short circuits in the all-solid-state battery is further suppressed. In addition, the amount of the resin used to form the side surface fixing portions 19 is decreased, and the energy density of the all-solid-state battery is increased.

(4) Fourth Embodiment

Figure 8:
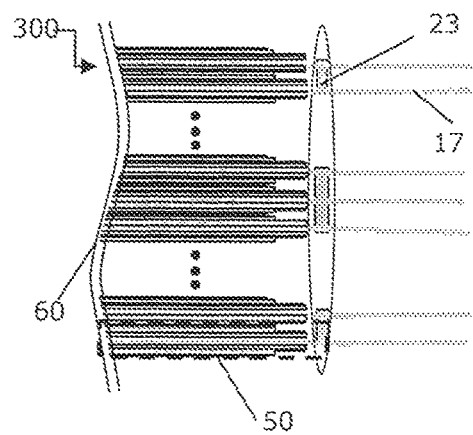
FIG. 8 is a schematic sectional view of the all-solid-state battery of the fourth embodiment.

FIG. 8 is a schematic sectional view of the all-solid-state battery of the fourth embodiment.

An all-solid-state battery 300 shown in FIG. 8 is the same as the all-solid-state battery 100 shown in FIG. 2, except that it comprises the current collector layer attaching portions 23 in place of the side surface fixing portions 19. FIG. 8 shows the battery in such a state that the anode current collector layer protrusions 17 are not bundled yet. In FIG. 8, the area surrounded by a solid line indicates the region serving as the bending starting point of the current collector layer protrusions.

The all-solid-state battery 300 is the all-solid-state battery of the fourth embodiment. In the all-solid-state battery 300, for at least one of the group of the anode current collector layers 13 and the group of the cathode current collector layers 10, at least two of the protrusions of the at least one of the group of the current collector layers, the at least two protrusions facing each other in the laminating direction of the battery laminate 60, may comprise a current collector layer attaching portion containing a resin, in at least a part of the predetermined region of the protrusions, and the at least two protrusions may be attached through the current collector layer attaching portion in a manner that allows them to be bent using the region as a bending starting point.

In the all-solid-state battery 300 of the disclosed embodiments, the at least two protrusions may be attached through the current collector layer attaching portion in a manner that allows them to be bent using the predetermined region as a bending starting point. For example, when the number of the anode current collector layer protrusions 17 is 5, (1) at least two of the anode current collector layer protrusions 17 may be attached through the current collector layer attaching portion 23; (2) one of the anode current collector layer protrusions 17, which is located at the center in the laminating direction, is not attached, and two facing anode current collector layer protrusions 17 are attached to each other, and the other two facing anode current collector layer protrusions 17 are attached to each other; or (3) all of the five anode current collector layer protrusions 17 may be attached.

In the fourth embodiment, by disposing the current collector layer attaching portions 23 in the predetermined position of the current collector layer protrusions, the curvature value of the current collector layer protrusions when bundled, is decreased. Accordingly, the formation of a crack in the cathode layer 11, the anode layer 14, the solid electrolyte layer 16, etc., when bundling the current collector layer protrusions, is suppressed, and the occurrence of short circuits in the all-solid-state battery is suppressed. Due to the absence of the side surface fixing portions, the energy density of the all-solid-state battery is increased compared to the first to third embodiments.

Figure 9:
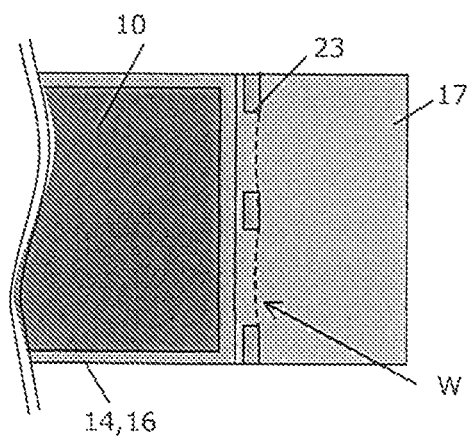
FIG. 9 is a schematic plan view of an example of an all-solid-state battery 300 viewed from above in the laminating direction.

FIG. 9 is a schematic plan view of an example of an all-solid-state battery 300 viewed from above in the laminating direction.

The all-solid-state battery 300 may comprise the current collector layer attaching portions 23 containing a resin, in at least a part of a predetermined region of each current collector layer protrusion.

The current collector layer attaching portions 23 may be disposed on side surfaces of each current collector layer protrusion, as long as they are disposed in at least a part of the region serving as the bending starting point of the current collector layer protrusions when bundled.

As shown in FIG. 9, from the viewpoint of further suppressing the occurrence of short circuits in the all-solid-state battery, the current collector layer attaching portions 23 may be disposed at, along the bending starting point W that is used when bundling the current collector layers, at least both ends and the center of the region serving as the bending starting point W on one surface of the current collector layer protrusions, to ensure that the current collector layer attaching portions 23 can be symmetric along the center line in the plane direction.

Figure 10:
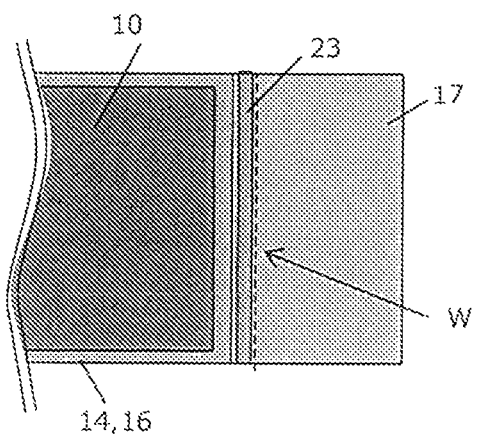
FIG. 10 is a schematic plan view of another example of the all-solid-state battery 300 viewed from the above in the laminating direction.

FIG. 10 is a schematic plan view of another example of the all-solid-state battery 300 viewed from the above in the laminating direction.

As shown in FIG. 10, from the viewpoint of further suppressing the occurrence of short circuits in the all-solid-state battery 300, the current collector layer attaching portions 23 may be disposed over the whole regions serving as the bending starting point W on at least one surface of the current collector layer protrusions, along the bending starting point W that is used when bundling the current collector layers.

As the adhesive used as the material for the current collector layer attaching portions 23, a conventionally-known adhesive or pressure-sensitive adhesive may be used. Also, it maybe selected from the resins exemplified above as the material for the side surface fixing portions.

The method for disposing the current collector layer attaching portions 23 is not particularly limited. From the viewpoint of better work efficiency, the adhesive may be applied to the current collector layer protrusions one by one, by use of a dispenser or the like, before bundling the current collector layer protrusions. Also, an adhesive-coated tape or the like may be attached to the predetermined region of the current collector layer protrusions. The current collector layer attaching portions 23 may be disposed after the battery laminate is produced, or it may be disposed in advance in the predetermined region of the current collector layer protrusions, before the battery laminate 60 is produced.

[Cathode]

The cathode comprises a cathode layer and a cathode current collector layer.

[Cathode Layer]

The cathode layer contains a cathode active material. As optional components, the cathode layer may contain a solid electrolyte, an electroconductive material, a binder, etc.

As the cathode active material, examples include, but are not limited to, a cathode active material represented by the following general formula: $Li_xM_yO_z$ (where M is a transition metal element; x is from 0.02 to 2.2; y is from 1 to 2; and z is from 1.4 to 4). The transition metal element M may be at least one selected from the group consisting of Co, Mn, Ni, V, Fe and Si, or it may be at least one selected from the group consisting of Co, Ni and Mn. As the cathode active material represented by the general formula $Li_xM_yO_z$, examples include, but are not limited to, $LiCoO_2$, $LiMnO_2$, $LiNiO_2$, $LiVO_2$, $LiNi_{1/3}Co_{1/3}Mn_{1/3}O_2$, $LiMn_2O_4$, $Li(Ni_{0.5}Mn_{1.5})O_4$, $Li_2FeSiO_4$ and $Li_2MnSiO_4$.

Cathode active materials other than the one represented by the general formula $Li_xM_yO_z$ include, for example, lithium titivates (such as $Li_4Ti_5O_{12}$), lithium metal phosphates (such as $LiFePO_4$, $LiMnPO_4$, $LiCoPO_4$ and $LiNiPO_4$), transition metal oxides (such as $V_2O_5$ and $MoO_3$), $TiS_2$, LiCoN, Si, $SiO_2$, $Li_2SiO_3$, $Li_4SiO_4$, and lithium storage intermetallic compounds (such as $Mg_2Sn$, $Mg_2Ge$, $Mg_2Sb$ and $Cu_3Sb$).

The form of the cathode active material is not particularly limited. It may be a particulate form.

A coating layer containing a Li ion conducting oxide may be formed on the surface of the cathode active material. This is because a reaction between the cathode active material and the solid electrolyte can be suppressed.

As the Li ion conducting oxide, examples include, but are not limited to, $LiNbO_3$, $Li_4Ti_5O_{12}$ and $Li_3PO_4$.

The content of the cathode active material in the cathode layer is not particularly limited. For example, it may be in a range of from 10 mass % to 100 mass %.

As the solid electrolyte used in the cathode layer, examples include, but are not limited to, those exemplified below as the solid electrolyte used in the below-described solid electrolyte layer. The content ratio of the solid electrolyte in the cathode layer is not particularly limited.

As the electroconductive material, a known electroconductive material may be used. As the electroconductive material, examples include, but are not limited to, a carbonaceous material and metal particles. For example, the carbonaceous material may be at least one selected from the group consisting of carbon nanotube, carbon nanofiber and carbon black such as acetylene black or furnace black. Of them, from the viewpoint of electron conductivity, the electroconductive material may be at least one selected from the group consisting of carbon nanotube and carbon nanofiber. The carbon nanotube and the carbon nanofiber may be vapor-grown carbon fiber (VGCF). As the metal particles, examples include, but are not limited to, particles of Al, particles of Ni, particles of Cu, particles of Fe and particles of SUS.

The content of the electroconductive material in the cathode layer is not particularly limited.

As the binder, examples include, but are not limited to, rubber-based binders such as butadiene rubber, hydrogenated butadiene rubber, styrene-butadiene rubber (SBR), hydrogenated styrene-butadiene rubber, nitrile-butadiene rubber, hydrogenated nitrile-butadiene rubber and ethylene-propylene rubber; fluoride-based binders such as polyvinylidene fluoride (PVdF), polyvinylidene fluoride-polyhexafluoropropylene copolymer (PVDF-HFP), polytetrafluoroethylene and fluorine rubber; polyolefin-based thermoplastic resins such as polyethylene, polypropylene and polystyrene; imide-based resins such as polyimide and polyamideimide; amide-based resins such as polyamide; acrylic resins such as polymethyl acrylate and polyethyl acrylate; and methacrylic resins such as polymethyl methacrylate and polyethyl methacrylate. The content of the binder in the cathode layer is not particularly limited.

The cathode layer can be formed as follows, for example. A cathode layer slurry is produced by putting the cathode active material and, as needed, the electroconductive material, the binder, etc., in a solvent and mixing them. The cathode layer slurry is applied on one surface of a support, and the applied cathode layer slurry is dried, thereby forming the cathode layer.

As the solvent, examples include, but are not limited to, butyl acetate, butyl butyrate, heptane and N-methyl-2-pyrrolidone.

The method for applying the cathode layer slurry on one surface of the support is not particularly limited. As the method, examples include, but are not limited to, a doctor blade method, a metal mask printing method, an electrostatic coating method, a dip coating method, a spray coating method, a roller coating method, a gravure coating method and a screen printing method.

The cathode layer may be formed by another method. For example, a powdered cathode mix that contains the cathode active material and, as needed, other components, is subjected to pressure-forming, thereby forming the cathode layer.

[Cathode Current Collector Layer]

The cathode current collector layer comprises a cathode current collector layer protrusion protruding in plane direction. Also, a cathode current collector tab may be electrically connected to the cathode current collector layer protrusion.

The cathode current collector layer functions to collect current from the cathode layer. As the cathode current collector layer, a conventionally-known material that is usable as a cathode current collector in all-solid-state batteries, may be appropriately selected, and it is not particularly limited.

As the material for the cathode current collector layer, examples include, but are not limited to, metal materials such as SUS, Ni, Cr, Au, Pt, Al, Fe, Ti and Zn.

The form of the cathode current collector layer is not particularly limited. As the form, examples include, but are not limited to, various kinds of forms such as a foil form and a mesh form. For the cathode current collector layer, the thickness and width may be the same or different between the protrusion and other portions, and they can be appropriately determined depending on the size, etc., of the all-solid-state battery. The length of the cathode current collector layer protrusion is not particularly limited. It may be appropriately controlled to be a length that allows easy bundling.

[Coat Layer]

The cathode current collector layer may be such a metal foil that at least a part of the surface is coated with a coat layer containing an electroconductive material such as Ni, Cr or C (carbon). Due to the presence of the coat layer, the formation of a passivated coating film on the cathode current collector layer and the resulting increase in the internal resistance of the all-solid-state battery, are suppressed.

The coat layer contains as least the electroconductive material. As needed, it may further contain other components such as a binder. As the binder that may be contained in the coat layer, examples include, but are not limited to, those mentioned above as the binder that may be contained in the cathode layer. The coat layer may be a plating or deposition layer composed of the electroconductive material.

As the coat layer, examples include, but are not limited to, a carbon coat layer in which 15 mass % of carbon (C) is contained as the electroconductive material, in which 85 mass % of polyvinylidene fluoride (PVDF) is contained as the binder, and which has a volume resistivity of $10 \times 10^3$ Ωcm.

The thickness of the coat layer is not particularly limited. From the viewpoint of suppressing an increase in the internal resistance of the all-solid-state battery, the thickness may be 1 μm or more and 50 μm or less, or it may be about 10 μm.

From the viewpoint of the ease of suppressing an increase in the internal resistance of the all-solid-state battery, the coat layer may be disposed in the region where, on the cathode current collector layer, the cathode current collector layer and cathode layer attached to each other are stacked.

[Anode]

The anode comprises the anode layer and the anode current collector layer.

[Anode Layer]

The anode layer contains an anode active material. As optional components, the anode layer may contain a solid electrolyte, an electroconductive material, a binder, etc.

As the anode active material, a conventionally-known material may be used. As the conventionally-known material, examples include, but are not limited to, elemental Li, a lithium alloy, carbon, elemental Si, a Si alloy and $Li_4Ti_5O_{12}$ (LTO).

As the lithium alloy, examples include, but are not limited to, LiSn, LiSi, LiAl, LiGe, LiSb, LiP and LiIn.

As the Si alloy, examples include, but are not limited to, alloys with metals such as Li. Also, the Si alloy may be an alloy with at least one kind of metal selected from the group consisting of Sn, Ge and Al.

The form of the anode active material is not particularly limited. For example, the anode active material may be in a particulate form or a thin film form.

When the anode active material is in a particulate form, the average particle diameter ($D_{50}$) of the anode active material particles may be 1 nm or more and 100 μm or less, or it may be 10 nm or more and 30 μm or less, for example.

As the electroconductive material, binder and solid electrolyte contained in the anode layer, examples include, but are not limited to, those exemplified above as the electroconductive material, binder and solid electrolyte contained in the above-described cathode layer.

The method for forming the anode layer is not particularly limited. As the method, examples include, but are not limited to, pressure-forming a powdered anode mix that contains the anode active material and, as needed, other components such as an electroconductive material and a binder. Another example of the method for producing the anode layer is as follows: an anode layer slurry containing the anode active material, a solvent and, as needed, other components such as an electroconductive material and a binder, is prepared; the anode layer slurry is applied on one surface of a support; and the applied anode layer slurry is dried, thereby forming the anode layer. As the solvent used in the anode layer slurry, examples include, but are not limited to, those exemplified above as the solvent used in the cathode layer slurry. As the method for applying the anode layer slurry to one surface of the support, examples include, but are not limited to, those exemplified above as the method for applying the cathode layer slurry.

[Anode Current Collector Layer]

The anode current collector layer comprises an anode current collector layer protrusion protruding in plane direction. Also, an anode current collector tab may be electrically connected to the anode current collector layer protrusion.

The anode current collector layer functions to collect current from the anode layer. As the anode current collector layer, a conventionally-known material that is usable as an anode current collector in all-solid-state batteries, may be appropriately selected, and it is not particularly limited.

As the material for the anode current collector layer, examples include, but are not limited to, metal materials such as SUS, Cu, Ni, Fe, Ti, Co and Zn.

The form of the anode current collector layer is not particularly limited. It may be the same form as the above-described cathode current collector layer. For the anode current collector layer, the thickness and width may be the same or different between the protrusion and other portions, and they can be appropriately determined depending on the size, etc., of the all-solid-state battery. The length of the anode current collector layer protrusion is not particularly limited. It may be appropriately controlled to be a length that allows easy bundling.

[Solid Electrolyte Layer]

The solid electrolyte layer contains at least a solid electrolyte.

As the solid electrolyte, examples include, but are not limited to, a sulfide-based solid electrolyte and an oxide-based solid electrolyte.

As the sulfide-based solid electrolyte, examples include, but are not limited to, $Li_2S$—$P_2S_5$, $Li_2S$—$SiS_2$, LiX—$Li_2S$—$SiS_2$, LiX—$Li_2S$-$P_2S_5$, LiX—$Li_2O$—$Li_2S$—$P_2S_5$, LiX—$Li_2S$—$P_2O_5$, LiX—$Li_3PO_4$—$P_2S_5$ and $Li_3PS_4$. The "$Li_2S$—$P_2S_5$" means a material composed of a raw material composition containing $Li_2S$ and $P_2S_5$, and the same applies to other solid electrolytes. Also, "X" in the "LiX" means a halogen element. The LiX contained in the raw material composition may be one or more kinds. When two or more kinds of LiX are contained in the raw material composition, the mixing ratio is not particularly limited.

For example, the sulfide-based solid electrolyte may be a sulfide-based solid electrolyte produced by mixing $Li_2S$ and $P_2S_5$ to ensure that the mass ratio between $Li_2S$ and $P_2S_5$ ($Li_2S/P_2S_5$) is 0.5 or more. From the viewpoint of excellent ion conductivity, the sulfide-based solid electrolyte may be a sulfide-based solid electrolyte obtained by mixing $Li_2S$ and $P_2S_5$ to ensure that the mass ratio of $Li_2S$ to $P_2S_5$ is 70:30.

The molar ratio of the elements in the sulfide-based solid electrolyte can be controlled by controlling the contents of the elements contained in raw materials. The molar ratio and composition of the elements in the sulfide-based solid electrolyte can be measured by inductively coupled plasma atomic emission spectroscopy, for example.

The sulfide-based solid electrolyte may be glass, crystal or crystalline glass ceramic.

The crystal state of the sulfide-based solid electrolyte can be confirmed by X-ray powder diffraction measurement using CuKa radiation, for example.

The glass can be obtained by amorphizing a raw material composition (such as a mixture of $Li_2S$ and $P_2S_5$). The raw material composition can be amorphized by mechanical milling, for example. The mechanical milling may be dry mechanical milling or wet mechanical milling. The mechanical milling may be the latter because attachment of the raw material composition to the inner surface of a container, etc., can be prevented.

The mechanical milling is not particularly limited, as long as it is a method for mixing the raw material composition by applying mechanical energy thereto. The mechanical milling may be carried out by, for example, a ball mill, a vibrating mill, a turbo mill, mechanofusion, or a disk mill. The mechanical milling may be carried out by a ball mill, or it may be carried out by a planetary ball mill. This is because the desired glass can be efficiently obtained.

The glass ceramic can be obtained by heating glass, for example.

The crystal can be obtained by heating glass or developing a solid state reaction of the raw material composition, for example.

For the heating, the heating temperature may be a temperature higher than the crystallization temperature (Tc) of the glass, which is a temperature observed by thermal analysis measurement. In general, it is 195° C. or more. On the other hand, the upper limit of the heating temperature is not particularly limited.

The crystallization temperature (Tc) of the glass can be measured by differential thermal analysis (DTA).

The heating time is not particularly limited, as long as the desired crystallinity is obtained. For example, it is in a range of from one minute to 24 hours, or it may be in a range of from one minute to 10 hours.

The heating method is not particularly limited. For example, a firing furnace may be used.

As the oxide-based solid electrolyte, examples include, but are not limited to, $Li_{6.25}La_3Zr_2Al_{0.25}O_{12}$, $Li_3PO_4$, and $Li_{3+x}PO_{4-x}N_x$ (LiPON).

From the viewpoint of handling, the form of the solid electrolyte may be a particulate form.

The average particle diameter ($D_{50}$) of the solid electrolyte particles is not particularly limited. The lower limit may be 0.5 μm or more, and the upper limit may be 2 μm or less.

As the solid electrolyte, one or more kinds of solid electrolytes may be used. In the case of using two or more kinds of solid electrolytes, they may be mixed together.

In the disclosed embodiments, unless otherwise noted, the average particle diameter of particles is a volume-based median diameter ($D_{50}$) measured by laser diffraction/scattering particle size distribution measurement. Also in the disclosed embodiments, the median diameter ($D_{50}$) of particles is a diameter at which, when particles are arranged in ascending order of their particle diameter, the accumulated volume of the particles is half (50%) the total volume of the particles (volume average diameter).

The content of the solid electrolyte in the solid electrolyte layer is not particularly limited.

From the viewpoint of exerting plasticity, etc., a binder for binding the solid electrolyte particles can be incorporated in the solid electrolyte layer. As the binder, examples include, but are not limited to, a binder that can be incorporated in the above-described cathode layer. However, the content of the binder in the solid electrolyte layer may be 5.0 mass % or less, from the viewpoint of preventing excessive aggregation of the solid electrolyte particles, enabling the formation of the solid electrolyte layer in which the solid electrolyte particles are uniformly dispersed, etc., for the purpose of easily achieving high battery power output.

The thickness of the solid electrolyte layer is not particularly limited and is appropriately controlled depending on the battery structure. It is generally 0.1 μm or more and 1 mm or less.

The solid electrolyte layer may be formed by pressure-forming a powdered material for forming the solid electrolyte layer, the material containing the solid electrolyte and, as needed, other components, for example.

As needed, the all-solid-state battery comprises an outer casing for housing the cathode, the anode and the solid electrolyte layer.

The form of the outer casing is not particularly limited. As the form, examples include, but are not limited to, a laminate form.

The material for the outer casing is not particularly limited, as long as it is a material that is stable in electrolytes. As the material, examples include, but are not limited to, resins such as polypropylene, polyethylene and acrylic resin, and an embossed aluminum laminate sheet.

As the all-solid-state battery, examples include, but are not limited to, an all-solid-state lithium battery in which a lithium metal deposition-dissolution reaction is used as an anode reaction, an all-solid-state lithium ion battery in which intercalation of lithium in the anode active material is used as an anode reaction, an all-solid-state sodium battery, an all-solid-state magnesium battery and an all-solid-state calcium battery. The all-solid-state battery may be the all-solid-state lithium ion battery. Also, the all-solid-state battery may be a primary or secondary battery.

As the form of the all-solid-state battery, examples include, but are not limited to, a coin form, a laminate form, a cylindrical form and a square form.

[All-Solid-State Battery Production Method]

The all-solid-state battery production method of the disclosed embodiments is not particularly limited, as long as it is a method by which the above-described all-solid-state battery of the disclosed embodiments is obtained. For example, the all-solid-state battery may be produced by the following method.

First, a solid electrolyte layer in a sheet form is disposed between a cathode in a sheet form and an anode in a sheet form, thereby obtaining a battery unit. A plurality of battery units are produced in this manner and stacked to obtain a battery laminate.

In the case of the first embodiment, then, the battery laminate is sandwiched between two flat plates in the laminating direction. While plane pressure, which may be from 0.05 MPa to 2 MPa, is applied to the battery laminate, a resin is applied to the predetermined positions of side surfaces of the battery laminate. The applied resin is cured, thereby disposing the side surface fixing portions at the predetermined positions of the side surfaces of the battery laminate.

In the case of the second or third embodiment, after the battery laminate is produced and before the side surface fixing portions are disposed, the current collector layer reinforcing portions or current collector layer attaching portions are formed in the predetermined region of the current collector layer protrusions, by use of a dispenser or a tape attaching device.

In the case of the fourth embodiment, after the battery laminate is produced, the current collector layer attaching portions are formed in the predetermined region of the current collector layer protrusions, by use of a dispenser or a tape attaching device, without disposing the side surface fixing portions.

After the side surface fixing portions or the current collector layer attaching portions are formed, the cathode current collector layer protrusions are bundled, and the anode current collector layer protrusions are bundled. The all-solid-state battery may be obtained by connecting the cathode current collector layer protrusions to an external cathode terminal by use of a current collecting lead, and connecting the anode current collector layer protrusions to an external anode terminal by use of a current collecting lead.

Two embossed aluminum laminates of a size that can cover the all-solid-state battery, may be prepared and disposed on the top and bottom of the all-solid-state battery in the laminating direction. The all-solid-state battery may be sandwiched between and covered with the aluminum laminates, which serve as an outer casing. Then, the four outer edges of the aluminum laminates may be sealed by heat sealing. The inside of the outer casing may be depressurized or non-depressurized. The inner pressure of the outer casing may be appropriately controlled when designing the outer casing.

Pressure is applied to the all-solid-state battery during the battery is in use. The pressure may be 1 MPa or more and 45 MPa or less, for example. Pressure is also applied to the all-solid-state battery during the battery is not in use. The pressure may be 0 MPa or more and 1 MPa or less, for example.

As the method for pressurizing the all-solid-state battery, examples include, but are not limited to, mechanical pressurization and gas pressurization.

As the mechanical pressurization, examples include, but are not limited to, pressurizing the all-solid-state battery in the laminating direction through a ball screw by driving a motor, and pressurizing the all-solid-state battery in the laminating direction through oil pressure by driving a motor. In the mechanical pressurization, the all-solid-state battery is pressurized or depressurized to a given pressure, and then the operating part of the machine is fixed by a mechanical stopper, whereby the energy consumption accompanied with the driving of the motor is minimized.

As the gas pressurization, examples include, but are not limited to, pressurizing the all-solid-state battery through pressurized gas supplied from an installed gas cylinder.

The all-solid-state battery of the disclosed embodiments is used as a battery source installed in a vehicle, a battery source for driving portable electronic devices, etc. However, the applications of all-solid-state battery of the disclosed embodiments are not limited to them.

Vehicles to which the all-solid-state battery of the disclosed embodiments is applicable, are not limited to electric vehicles which are equipped with a battery and which are not equipped with an engine. They also include hybrid electric vehicles equipped with both a battery and an engine.

REFERENCE SIGNS LIST

10. Cathode current collector layer
11. Cathode layer
12. Cathode
13. Anode current collector layer
14. Anode layer
15. Anode
16. Solid electrolyte layer
17. Anode current collector layer protrusion
18. Cathode current collector layer protrusion
19. Side surface fixing portion
21. Bundled portion
22. Current collector layer reinforcing portion
23. Current collector layer attaching portion
30. Peripheral portion
50. Battery unit
60. Battery laminate
100. All-solid-state battery
200. All-solid-state battery
300. All-solid-state battery
L. Plane direction
W. Bending starting point of current collector layer protrusion

The invention claimed is:

1. An all-solid-state battery comprising a battery laminate composed of two or more battery units, each of which comprises a cathode comprising a cathode current collector layer and a cathode layer, an anode comprising an anode current collector layer and an anode layer, and a solid electrolyte layer disposed between the cathode layer and the anode layer,
  wherein a width of the anode layer is larger than a width of the cathode layer;
  wherein the anode current collector layer comprises an anode current collector layer protrusion protruding in plane direction at any one side of the battery laminate;
  wherein the cathode current collector layer comprises a cathode current collector layer protrusion protruding in plane direction at any one side of the battery laminate; and
  wherein the battery laminate comprises side surface fixing portions composed of a resin, in at least any one of a peripheral portion including side surfaces of the anode current collector layer protrusion at both adjacent sides of an anode current collector layer protrusion side of the anode current collector layer, and a peripheral portion including side surfaces of the cathode current collector layer protrusion at both adjacent sides of a cathode current collector layer protrusion side of the cathode current collector layer;
  wherein, for at least one of a group of the anode current collector layers and a group of the cathode current collector layers, at least one of the protrusions of the at least one of the group of the current collector layers comprises a current collector layer reinforcing portion comprising a reinforcing material, in at least a part of a predetermined region of the protrusion.

2. The all-solid-state battery according to claim 1, wherein, for at least one of a group of the anode current collector layers and a group of the cathode current collector layers, at least two of the protrusions of the at least one of the group of the current collector layers, the at least two protrusions facing each other in the laminating direction of the battery laminate, comprise a current collector layer attaching portion containing a resin, in at least a part of a predetermined region of the protrusions, and wherein the at least two protrusions are attached through the current collector layer attaching portion in a manner that allows them to be bent using the region as a bending starting point.

3. An all-solid-state battery comprising a battery laminate composed of two or more battery units, each of which comprises a cathode comprising a cathode current collector layer and a cathode layer, an anode comprising an anode current collector layer and an anode layer, and a solid electrolyte layer disposed between the cathode layer and the anode layer,
  wherein a width of the anode layer is larger than a width of the cathode layer;
  wherein the anode current collector layer comprises an anode current collector layer protrusion protruding in plane direction at any one side of the battery laminate;
  wherein the cathode current collector layer comprises a cathode current collector layer protrusion protruding in plane direction at any one side of the battery laminate; and
  wherein, for at least one of a group of the anode current collector layers and a group of the cathode current collector layers, at least two of the protrusions of the at least one of the group of the current collector layers, the at least two protrusions facing each other in the laminating direction of the battery laminate, comprise a current collector layer attaching portion containing a resin, in at least a part of a predetermined region of the protrusions, and wherein the at least two protrusions are attached through the current collector layer attaching portion in a manner that allows them to be bent using the region as a bending starting point.

4. The all-solid-state battery according to claim 1, wherein the solid electrolyte layer contains a sulfide-based solid electrolyte or an oxide-based solid electrolyte.

5. The all-solid-state battery according to claim 1, wherein the current collector layer reinforcing portions are disposed at, along a bending starting point W that is used when bundling the current collector layers, at least both ends and the center of the region serving as the bending starting point W.

6. The all-solid-state battery according to claim 1, wherein the current collector layer reinforcing portion is disposed over the whole regions serving as the bending starting point W of the protrusions, along the bending starting point W that is used when bundling the current collector layers.

* * * * *